United States Patent

Rudy et al.

(10) Patent No.: US 7,611,285 B2
(45) Date of Patent: Nov. 3, 2009

(54) LINEAR BALL BEARING

(75) Inventors: Dietmar Rudy, Kleinbundenbach (DE); Ralf Moseberg, Kindsbach (DE); Michael Heid, Kleinblittersdorf (DE); Patrick Daniel, Kirkel (DE); Wolfgang Bauer, Riegelsberg (DE)

(73) Assignee: INA-Schaeffler KG, Herzogenaurach (DE)

( * ) Notice: Subject to any disclaimer, the term of this patent is extended or adjusted under 35 U.S.C. 154(b) by 902 days.

(21) Appl. No.: 10/552,341

(22) PCT Filed: Mar. 26, 2004

(86) PCT No.: PCT/EP2004/003191

§ 371 (c)(1),
(2), (4) Date: Dec. 8, 2005

(87) PCT Pub. No.: WO2004/090359

PCT Pub. Date: Oct. 21, 2004

(65) Prior Publication Data

US 2006/0210204 A1 Sep. 21, 2006

(30) Foreign Application Priority Data

Apr. 11, 2003 (DE) ................................ 103 17 049

(51) Int. Cl.
*F16C 29/06* (2006.01)

(52) U.S. Cl. .......................................... 384/45; 384/43

(58) Field of Classification Search .................. 384/43, 384/44, 45, 520
See application file for complete search history.

(56) References Cited

U.S. PATENT DOCUMENTS

| 3,292,981 A | 12/1966 | Zaugg |
| 5,863,132 A | 1/1999 | Smith et al. |
| 5,927,858 A | 7/1999 | Agari |

FOREIGN PATENT DOCUMENTS

| DE | 18 66 122 | 1/1963 |
| DE | 25 04 741 | 8/1975 |
| DE | 26 18 535 | 11/1977 |
| DE | 100 49 578 | 4/2002 |
| EP | 10 24 305 | 8/2000 |
| GB | 2 83 925 | 8/1928 |

*Primary Examiner*—William C Joyce
(74) *Attorney, Agent, or Firm*—Charles A. Muserlian

(57) ABSTRACT

A linear ball bearing having a guide carriage (2) which is guided on a guide rail (1) in a longitudinally displaceable manner and is mounted in rolling contact on longitudinal sides of the guide rail (1) via balls (3) which are arranged on each longitudinal side in at least two parallel ball rows (4, 5) encircling in endless ball channels (6), each ball (3) of the one ball row (5) together with an adjacent ball (3) of the other ball row (4) being held all round in cage pockets (8) of a common cage piece (7), the cage piece (7) having exactly two cage pockets (8) for one ball (3) each from both ball rows (4, 5), each cage piece (7), as viewed in the running direction of the balls (3), being provided at both ends with convexly curved end surfaces (9) for contact with the end surfaces (9) of adjacent cage pieces (7), which end surfaces (9) extend essentially up to the cage piece sides (10).

3 Claims, 2 Drawing Sheets

LINEAR BALL BEARING

This application is a 371 of PCT/EP2004/003191 filed Mar. 26, 2004

FIELD OF THE INVENTION

The present invention relates to a linear ball bearing having a guide carriage which is guided on a guide rail in a longitudinally displaceable manner.

BACKGROUND OF THE INVENTION

DE 26 18 535 A1, for example, has disclosed a linear ball bearing having a guide carriage which is guided on a guide rail in a longitudinally displaceable manner and is mounted in rolling contact on longitudinal sides of the guide rail via balls. The balls are arranged on each longitudinal side in at least two parallel ball rows encircling in endless ball channels. All the balls are held in cage pieces. A total of four balls are held all round in a cage piece, to be precise two balls of the one row and two balls of the other row. In order to eliminate possible distortion forces, provision is made for the cage pieces to be of elastic design in the running direction or for them to be provided with elastic means. End surfaces, touching one another, of cage pieces adjacent to one another extend only over part of the width of the cage pieces in order to avoid deformations on lobes which enclose the balls. If these lobes are deformed under undesirable contact, jamming of the balls may occur. The fact that the end surfaces, touching one another, of the cage pieces, as viewed transversely to the running direction, extend only over a small part of the width of the cage piece encourages undesirable tilting of this cage piece. However, in these known linear ball bearings, tilting is prevented by virtue of the fact that two balls each of both ball rows, that is to say a total of four balls, are mounted in a common cage piece. A disadvantage with this known cage, however, is that, on account of the considerable extent of the cage piece which is required in the running direction, tight deflecting radii in the deflecting region of the linear ball bearing can only be overcome with difficulty.

SUMMARY OF THE INVENTION

The object of the present invention is therefore to specify a linear ball bearing according to the features of the precharacterizing clause of claim 1 in which this disadvantage is removed. According to the invention, this object is achieved in that the cage piece has exactly two cage pockets for one ball each from both ball rows, that is to say for exactly one pair of balls of both ball rows, each cage piece, as viewed in the running direction of the balls, being provided at both ends with convexly curved end surfaces for contact with the end surfaces of adjacent cage pieces, which end surfaces extend essentially up to the cage piece sides.

The invention dispenses with spring elements, as are required in the prior art. With the invention, very tight deflecting radii for the cage pieces are possible, since the cage pieces require only a small construction space as viewed in the running direction of the balls. The fact that one ball each of both ball rows is arranged in a common cage piece would encourage lateral tilting of the cage pieces without further measures. However, the end surfaces extending according to the invention up to the cage piece sides prevent the risk of lateral tilting of the cage pieces.

The two cage pockets of the cage piece are preferably connected to one another in one piece by a web whose web sides facing away from one another and arranged essentially parallel to the running direction of the balls are provided with contact surfaces for guiding the cage piece on guide surfaces of the guide carriage. In this developed linear ball bearing according to the invention, the risk of tilting of the cage piece is even further reduced. The web sides provided with the contact surfaces can be guided satisfactorily on the guide surfaces of the guide carriage. The movement of the balls through the endless ball channels is satisfactorily ensured overall, tight deflecting radii for the cage pieces being possible with the linear ball bearing according to the invention.

The end surfaces of the cage pieces preferably have a partly cylindrical profile, the cylinder axis of which is arranged transversely to the running direction of the balls and parallel to a plane in which the two ball rows on the longitudinal side lie.

BRIEF DESCRIPTION OF THE DRAWINGS

The invention is explained in more detail below with reference to an exemplary embodiment shown in a total of six figures. In the drawing.

DETAILED DESCRIPTION OF THE DRAWINGS

Figure 1:
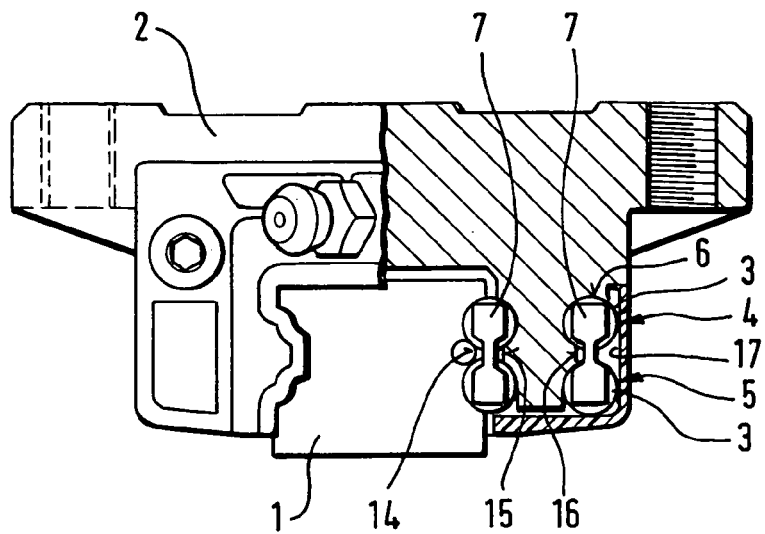
FIG. 1 shows a linear ball bearing according to the invention in partial section.
Figure 1A:
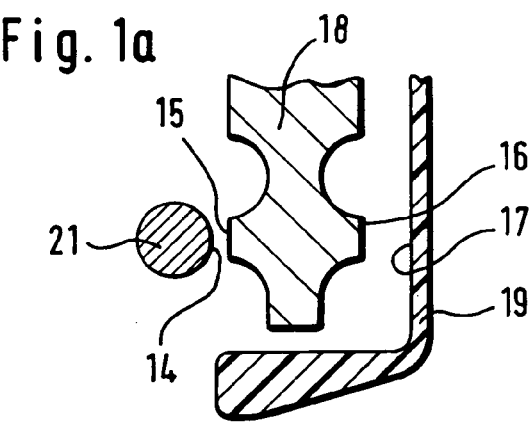
FIG. 1a shows a detail of the linear ball bearing from FIG. 1.
Figure 2:
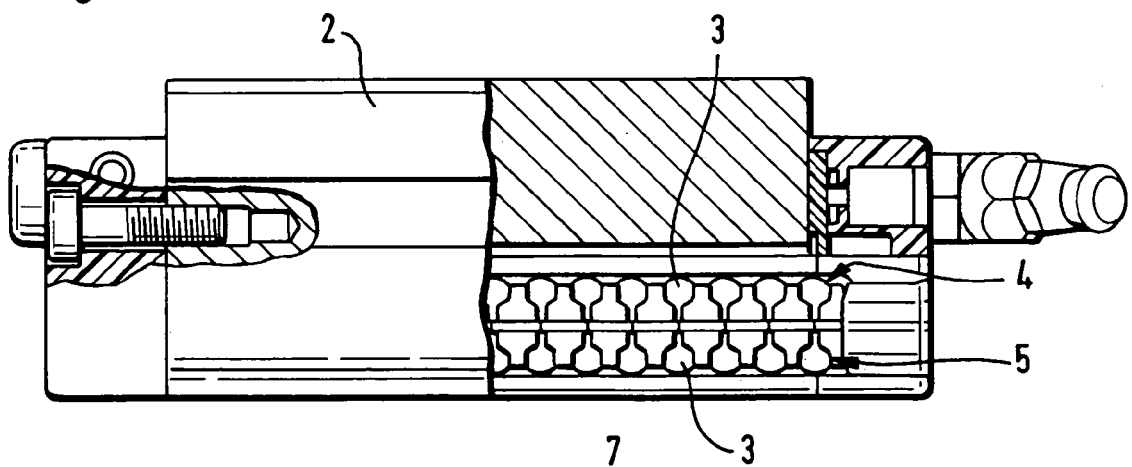
FIG. 2 shows the linear ball bearing according to the invention in a side view.

FIGS. 1, 1a and 2 show a linear ball bearing according to the invention in sectional view and in side view. A guide carriage 2 is supported in a longitudinally displaceable manner on a guide rail 1 via balls 3. The guide carriage 2 contains a total of four encircling ball rows 4 and 5. Of the latter, only two ball rows 4 and 5 on one side are shown in section. The ball row 4 is the top row, whereas the ball row 5 is the bottom row. The guide carriage 2 shown in FIG. 2 is of symmetrical construction. The guide rail 1, on which the guide carriage 2 is displaceable in the axial direction, is designed as a profile rail. The displacement is made possible by the rolling of the balls 3 on the guide rail 1 and the guide carriage 2.

During the axial displacement, the balls 3 run in the guide carriage 2 in endless ball channels 6. When the guide carriage 2 is being displaced, the balls 3, in a design without spacers, could strike against one another and thus cause noise. To prevent such noise generation, the balls 3 are separated from one another by cage pieces 7.

Figure 3:
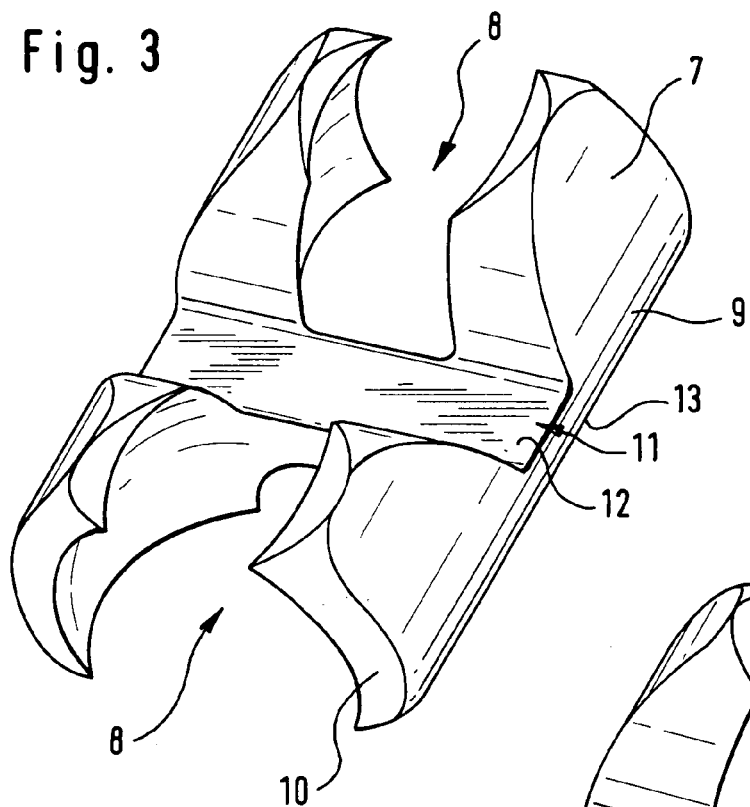
FIG. 3 shows a cage piece of the linear ball bearing according to the invention according to FIGS. 1 and 2 as a detail.

Each ball 3 of the one ball row 4 forms a pair with an adjacent ball 3 of the other ball row 5, and this pair is held all round in cage pockets 8 of a common cage piece 7. The cage pockets 8 enclose the balls 3 in the shape of a spherical indentation. The cage piece 7 has exactly two cage pockets 8 for exactly one pair of balls 3 of both ball rows 4, 5. As viewed in the running direction of the balls 3, each cage piece 7 is provided at both ends with convexly curved end surfaces 9 for contact with the end surfaces 9 of adjacent cage pieces 7. The end surfaces 9 extend essentially up to the cage piece sides 10; lateral tilting of the cage pieces 7 is avoided, since the one cage piece 7 can be supported on the adjacent cage piece 7 in contact with the end surfaces 9. In other words, the end surfaces 9 in this case extend over the entire width of the cage piece 7. The cage piece 7 is depicted especially clearly in perspective illustrations in FIGS. 3 and 4.

The two cage pockets 8 of the cage piece 7 are connected to one another in one piece by a flat web 11. Web sides facing away from one another and arranged essentially parallel to the running direction of the ball 3 are provided with contact surfaces 12, 13 for guiding the cage piece 7 on guide surfaces 14, 15, 16, 17 of the guide carriage 2. FIG. 1a shows a detail of the linear ball bearing according to the invention from FIG. 1. A leg 18 of the guide carriage 2 can be seen in this figure. The guide surfaces 15, 16 are formed directly on the leg 18. The guide surface 14 is formed on a wire 21 which is fastened to the ends of the guide carriage 2. The guide surface 17 is formed on a cover 19.

The end surfaces 9 of the cage piece 7 have a partly cylindrical profile, the cylinder axis of which is arranged transversely to the running direction of the balls 3 and parallel to a plane in which the two ball rows of a longitudinal side lie. End surfaces 9, touching one another, of cage pieces 7 adjacent to one another, can satisfactorily roll on one another, even in the case of tight deflecting radii, without there being the risk of canting or of lateral escape.

Figure 4:
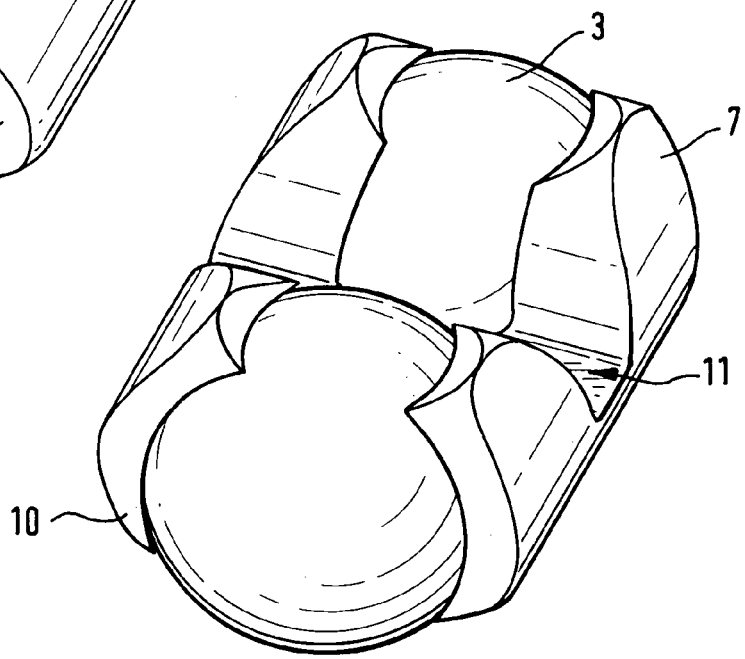
FIG. 4 shows the cage piece from FIG. 3, but with inserted balls.

It can clearly be seen in FIG. 4 that the cage pockets 8 enclose the balls 3 all round.

Figure 5:
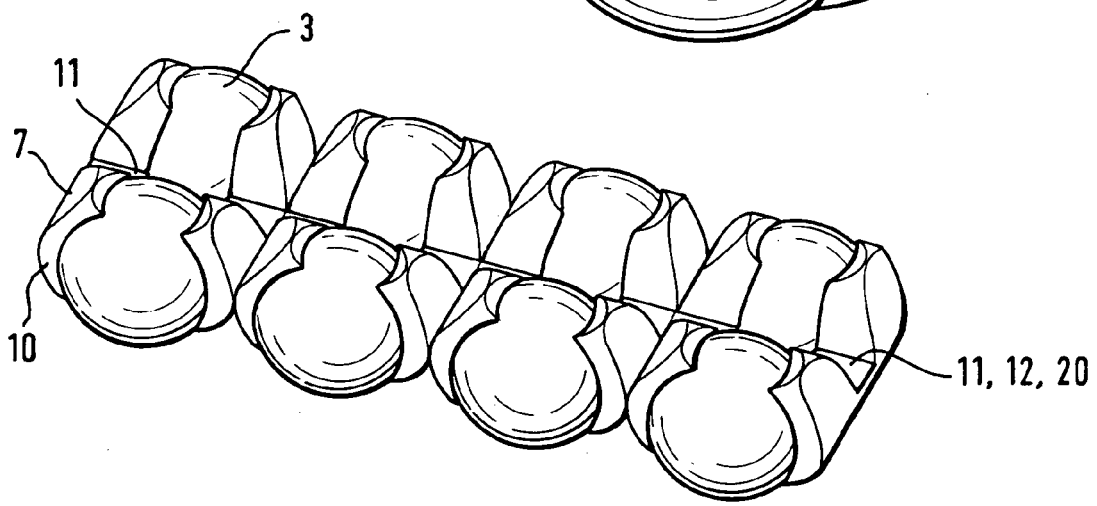
FIG. 5 shows a plurality of cage pieces arranged one behind the other with inserted balls.

FIG. 5 shows a plurality of cage pieces 7 arranged one behind the other, the end surfaces 9 of which are touching one another. The flat webs 11 together form an endless web band 20.

The invention claimed is:

1. A linear ball bearing having a guide carriage (2) which is guided on a guide rail (1) in a longitudinally displaceable manner and is mounted in rolling contact on longitudinal sides of the guide rail (1) via balls (3) which are arranged on each longitudinal side in at least two parallel ball rows (4, 5) encircling in endless ball channels (6), each ball (3) of the one ball row (5) together with an adjacent ball (3) of the other ball row (4) being held in cage pockets (8) of a common cage piece (7), characterized in that the cage piece (7) has exactly two cage pockets (8) for one ball (3) each from both ball rows (4, 5), each cage piece (7), as viewed in the running direction of the balls (3), being provided at both ends with convexly curved end surfaces (9) for contact with the end surfaces (9) of adjacent cage pieces (7), which end surfaces (9) extend essentially up to the cage piece sides (10).

2. The linear ball bearing as claimed in claim 1, in which the two cage pockets (8) of the cage piece (7) are connected to one another in one piece by a web (11) whose web sides facing away from one another and arranged essentially parallel to the running direction of the balls (3) are provided with contact surfaces (12, 13) for guiding the cage piece (7) on guide surfaces (14, 15, 16, 17) of the guide carriage (2).

3. The linear ball bearing as claimed in claim 1, in which the end surfaces (9) have a partly cylindrical profile, the cylinder axis of which is arranged transversely to the running direction of the balls (3) and parallel to a plane in which the two ball rows (4, 5) of a longitudinal side lie.

* * * * *